United States Patent [19]
Leclerc et al.

[11] Patent Number: 6,005,708
[45] Date of Patent: Dec. 21, 1999

[54] WAVELENGTH CONVERTER FOR BINARY OPTICAL SIGNALS

[75] Inventors: Denis Leclerc, Igny; Léon Goldstein, Chaville; Jean-Yves Emery, Palaiseau; Béatrice Dagens, Paris; Christopher Janz, Issy les Moulineaux, all of France; Michael Schilling, Stuttgart; Klaus Wunstel, Schwieberdinger, both of Germany

[73] Assignee: Alcatel, Paris, France

[21] Appl. No.: 09/057,512

[22] Filed: Apr. 9, 1998

[30] Foreign Application Priority Data

Apr. 10, 1997 [FR] France ................. 97 04401

[51] Int. Cl.⁶ ..................... G02F 1/39
[52] U.S. Cl. ............... 359/326; 359/332
[58] Field of Search ................. 359/326–332

[56] References Cited

U.S. PATENT DOCUMENTS

| | | | |
|---|---|---|---|
| 4,775,215 | 10/1988 | Teng et al. | 359/326 X |
| 5,619,368 | 4/1997 | Swanson | 359/326 |
| 5,673,140 | 9/1997 | Fisher | 359/332 |
| 5,903,384 | 5/1999 | Bülow | 359/332 |

FOREIGN PATENT DOCUMENTS

0717482 A1  6/1996  European Pat. Off. .

OTHER PUBLICATIONS

W. Idler et al. "10 GB/S Wavelength Conversion with Integrated Multiquantum–Well–Based 3–Port Mach–Zehnder Interferometer", IEEE Photonics Tehcnology Letters, vol. 8, No. 9 Sep. 1996, pp. 1163–1165.

*Primary Examiner*—John D. Lee
*Attorney, Agent, or Firm*—Sughrue, Mion Zinn, Macpeak & Seas, PLLC

[57] ABSTRACT

The invention relates to wavelength converters for optical signals, as used in telecommunications, in particular for routing signals. The invention relates in particular to a wavelength converter including an interferometer structure for delivering an output optical signal, in which converter first and second branches, including at least one first semiconductor optical amplifier, are coupled to input peripheral semiconductor optical amplifiers and/or to an output peripheral semiconductor optical amplifier, wherein the structure of the active waveguide of at least one peripheral amplifier is so designed that it has a ratio of active area to confinement factor greater than that of the active waveguide of said first amplifier.

8 Claims, 7 Drawing Sheets

× Γ=0,38  n1 / n2 / n1

◇ Γ=0,34  n3 / n2 / n3 n1<n3<n2

WAVELENGTH CONVERTER FOR BINARY OPTICAL SIGNALS

FIELD OF THE INVENTION

The invention relates to optoelectronic systems used for processing or transmitting digital data optically.

It relates more particularly to optical signal wavelength converters used in telecommunications to convert a transmitted optical signal from one wavelength to another wavelength while retaining signal performance.

BACKGROUND OF THE INVENTION

Such changes in wavelength are used in particular to solve problems of conflict when routing signals.

In such converters, the information is often in the form of binary data represented by pulses modulating an optical carrier wave. A binary value is thus determined as a function of the amplitude (or power) level of the modulated lightwave.

During transmission, the signal can be subjected to degradation that makes it more difficult for receivers to detect the high levels and the low levels of the received signal.

In the amplitude domain, the quality of an optical signal is usually defined by at least two parameters: the signal-to-noise ratio and the extinction ratio.

The signal-to-noise ratio is defined as the ratio of the optical power of the signal to the noise power in a wavelength band including the wavelength of the carrier of the signal.

The extinction ratio is defined as the power ratio corresponding to the high levels of the signal divided by the low levels of the signal. This ratio must be high enough in spite of variations in the input signal.

One common way of making a wavelength converter consists in using an interferometer structure of the Mach-Zehnder type or of an equivalent type.

Such an interferometer structure is shown in FIG. 1. It is made up of two guiding branches 1 and 2. At least one of the branches is provided with a semiconductor optical amplifier $OA_1$. In general, for reasons of symmetry, it is preferable to place a second semiconductor optical amplifier $OA_2$ on the other branch 2 as well. The presence of the second semiconductor optical amplifier $OA_2$ makes it possible to retain substantially the same amplification level in both of the branches of the structure, and therefore to have substantially identical power levels at the outputs of the branches of the interferometer.

A first coupler $K_1$ makes it possible to couple one end of each of the branches to a peripheral semiconductor optical amplifier, also referred to as an "input" amplifier, $OA_5$. A laser source 7 makes it possible to deliver an output carrier wave M of wavelength $\lambda_s$ to the peripheral amplifier $OA_5$.

A second coupler $K_2$ is disposed so as to couple the other end of the first branch 1 to another input peripheral semiconductor optical amplifier $OA_4$. The coupler $K_2$ enables an input signal E to be fed into the first amplifier $OA_1$, the input signal being of wavelength $\lambda_e$ and having been amplified by the input amplifier $OA_4$.

A third coupler $K_3$ connected to the coupler $K_2$, to the second amplifier $OA_2$, and to another peripheral semiconductor optical amplifier $OA_3$ for output purposes, is disposed so as to deliver an output signal S resulting from coupling of the auxiliary waves $AM_1$, and $AM_2$ delivered by respective ones of the first and second amplifiers $OA_1$ and $OA_2$. The waves $AM_1$, and $AM_2$ correspond to the waves $M_1$ and $M_2$ output by the coupler $K_1$ and amplified by respective ones of the amplifiers $OA_1$ and $OA_2$. The output signal S, of wavelength $\lambda_s$, is then amplified by the output peripheral amplifier $OA_3$.

Another peripheral amplifier $OA_6$ is also provided to keep the structure symmetrical and to enable either one of the amplifiers $OA_3$ or $OA_4$ to be replaced in the event of amplifier failure.

Currents $I_1$ and $I_2$ are injected into respective ones of the amplifiers $OA_1$ and $OA_2$ via electrodes $E_1$ and $E_2$. The output signal S results from the waves $AM_1$, and $AM_2$ interfering constructively or destructively, depending on the phase difference between the two branches of the interferometer.

To obtain effective wavelength conversion, the saturation power threshold of such an interferometer structure is set relatively low, which is favorable to conversion in the branches of the Mach-Zehnder structure but is unfavorable to the extinction ratio in the output amplifier. When the power of the signal that arrives at $K_3$ (FIG. 1), for example, exceeds the saturation threshold, which is low, high level gain becomes smaller than low level gain, so that the high levels of the output signal S are compressed, and the signal is therefore distorted. Such distortion may also occur on the input signal E, or on the output carrier wave M. Unfortunately, if the input signal E is distorted, or if the output carrier wave M is distorted, then the output signal S is also degraded, and the extinction ratio of the interferometer structure is reduced.

OBJECTS AND SUMMARY OF THE INVENTION

An object of the invention is to remedy those drawbacks. A particular object of the invention is to provide a wavelength converter comprising an interferometer structure of the Mach-Zehnder type or of an equivalent type that has firstly a relatively low saturation threshold on its branches, so as to make wavelength conversion effective, and secondly a relatively high saturation threshold at the periphery, i.e. at the inputs and/or outputs of the interferometer structure, to obtain an input signal and/or an output signal that is/are not distorted.

More precisely, the invention provides a wavelength converter including an interferometer structure for delivering an output optical signal, in which converter first and second branches, including at least one first semiconductor optical amplifier, are coupled to input peripheral semiconductor optical amplifiers and/or to an output peripheral semiconductor optical amplifier, wherein the structure of the active waveguide of at least one peripheral amplifier is so designed that it has a ratio of active area to confinement factor (S/Γ) greater than that of the active waveguide of said first amplifier.

In a first particular solution, the active waveguide(s) of said peripheral amplifier(s) is/are wider than the active waveguide of said first amplifier.

In a second particular solution, each of the active waveguides of the amplifiers is buried in a cladding layer, and the cladding layer(s) of said peripheral amplifier(s) has/have a refractive index that is different from the refractive index of the cladding layer of said first amplifier, so as to modify the confinement factor (Γ) of the lightwave travelling through the successive active waveguides.

In which case, the peripheral amplifier(s) preferably has/have a cladding layer/cladding layers whose refractive index is less than the refractive index of its/their active waveguide(s), but that is greater than the refractive index of the cladding layer of said first amplifier.

In a third particular solution, the active waveguide(s) of said peripheral amplifier(s) has/have a thickness less than that of the active waveguide of said first amplifier.

In a fourth particular solution, the active waveguide(s) of said peripheral amplifier(s) has/have a thickness greater than that of the active waveguide of said first amplifier.

BRIEF DESCRIPTION OF THE DRAWINGS

Other features and advantages of the present invention appear on reading the following description given by way of non-limiting example and with reference to the accompanying figures, in which.

MORE DETAILED DESCRIPTION

In the remainder of the description, like elements are given like references.

To make wavelength conversion effective, each of the semiconductor optical amplifiers $OA_1$ and $OA_2$ situated on the branches of the Mach-Zehnder or equivalent type interferometers must have a relatively low saturation threshold.

To optimize the extinction ratio and to prevent the input signal E and the output carrier wave M from also being distorted, it is necessary for each of the peripheral amplifiers $OA_3$, $OA_4$, and $OA_5$ to have a saturation threshold that is as high as possible. A saturation threshold that is high makes it possible to avoid compressing the high levels of a signal, i.e. to avoid distorting the signal.

The present invention makes it possible to provide a wavelength converter in which both types of semiconductor optical amplifier $OA_1$, $OA_2$ and $OA_3$, $OA_4$, $OA_5$ are integrated.

Advantageously, the saturation power of a semiconductor optical amplifier is proportional to the ratio of its active sectional area to its confinement factor S/Γ. The active area S is defined as being the product of the width W of the active waveguide of the amplifier multiplied by its thickness d. The confinement factor Γ corresponds to that fraction of the power of the lightwave which is situated in the active layer.

To increase the saturation threshold of a semiconductor optical amplifier relative to the saturation threshold of the first and second amplifiers $OA_1$, $OA_2$ situated in the branches 1 and 2 of the interferometer structure, it is thus necessary to increase the ratio S/Γ relative to that of the active waveguide of each of the first and second amplifiers $OA_1$ and $OA_2$.

For this purpose, a first solution consists in widening the active layer strips 3, 4, 5 in the output amplifier $OA_3$ and/or in the input amplifiers $OA_4$, $OA_5$. Widening the active waveguide induces a change both in its active area S and in its confinement factor Γ.

Figure 2:
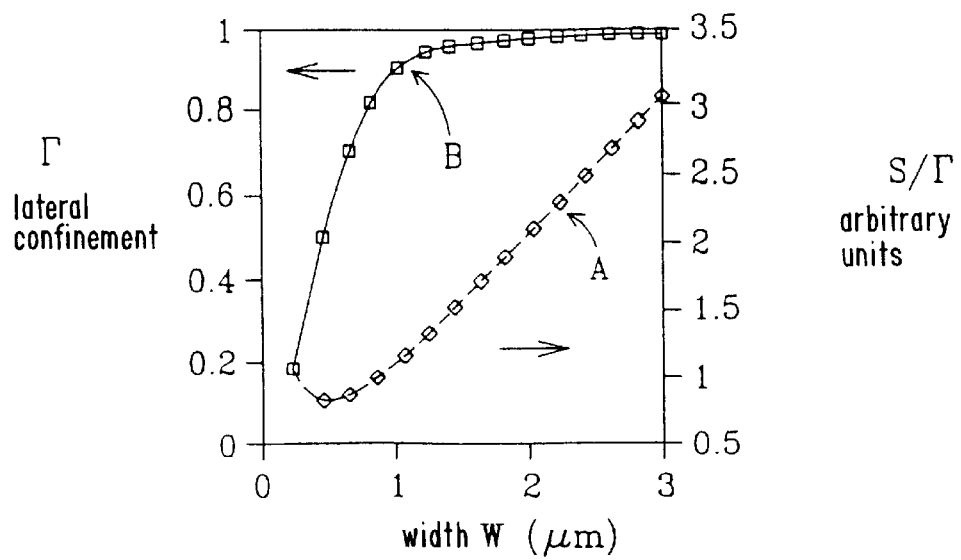
FIG. 2 gives two curves, one of which, A, shows how the ratio of active area to confinement factor (S/Γ) varies as a function of the width (W) of the active waveguide, the other curve, B, showing how the confinement factor (Γ) varies as a function of the width (W) of the active waveguide.

FIG. 2 shows how variation in the width of the active waveguide of an amplifier influences the ratio S/Γ and the confinement factor Γ of the waveguide. Curve A shows that the ratio S/Γ increases with increasing active waveguide width W. However, if the width W of the waveguide is reduced to below a threshold equal to 0.5 μm, in the example given, the ratio S/Γ can increase slightly. It is however very difficult to control the manufacturing technology to make active layer strips of width lying approximately in the range 0.1 μm to 0.5 μm.

Curve B shows that the confinement factor Γ increases very rapidly with increasing active waveguide width W when the width lies approximately in the range 0.1 μm to 1 μm, then it tends to level off to a value of 1 for widths W greater than 1 μm. Therefore, when the width of a strip is widened to a value lying in the range 2 μm to 3 μm, for example, the confinement factor Γ remains substantially constant, whereas the active area S, and therefore the ratio S/Γ increases considerably.

Figure 3:
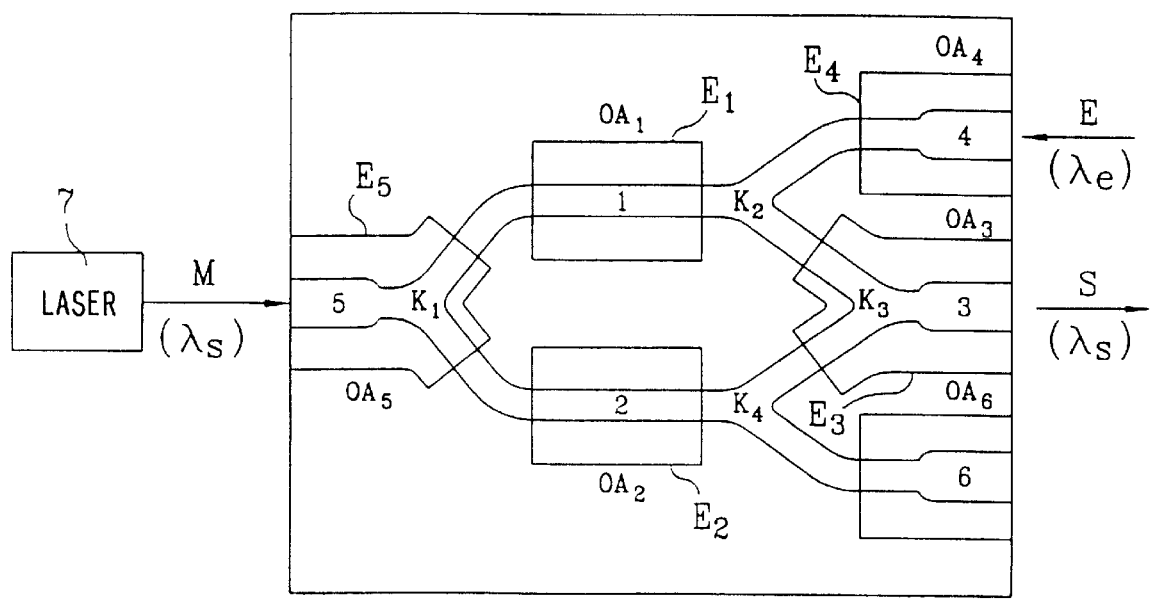
FIG. 3 is a diagram showing a first embodiment of a wavelength converter.

The diagram in FIG. 3 shows a wavelength converter in which the width of the active waveguides in the input peripheral amplifiers $OA_5$, $OA_4$ and in the output peripheral amplifier $OA_3$ has been increased compared with the width of the active waveguides in the first and second amplifiers $OA_1$ and $OA_2$ situated on the branches of the interferometer.

Figure 4A:
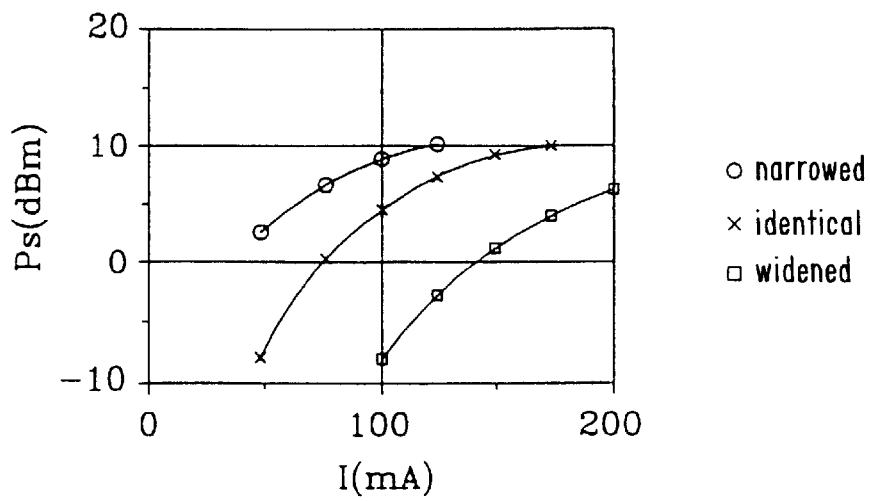
FIGS. 4A to 4C give curves respectively showing how the output power ($P_s$), the extinction ratio (ER), and the signal-to-noise ratio (S/N) vary as a function of the injected current (I) and of the width of the active waveguide of a peripheral amplifier.
Figure 4B:
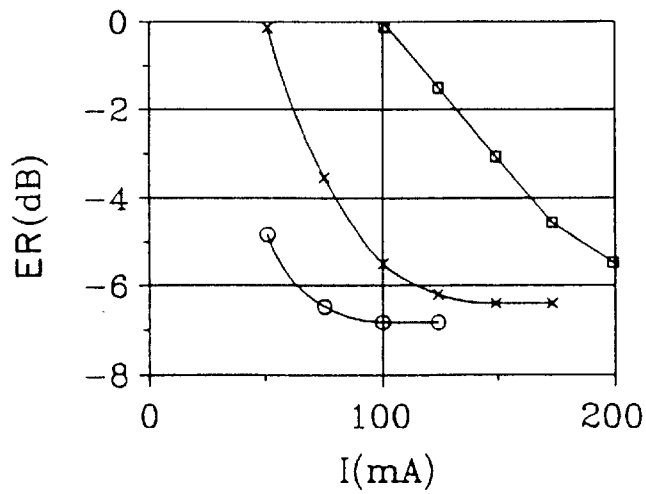
Figure 4C:
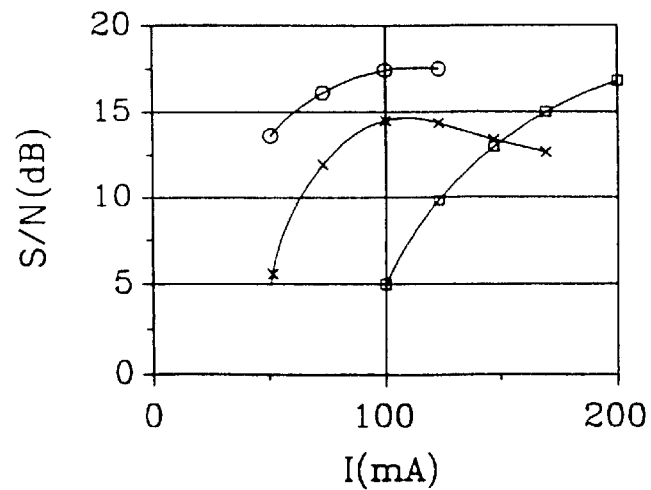

The curves in FIGS. 4A to 4C make it possible to compare the results obtained on the basis of input and/or output amplifiers in which the width of the active layer strips is identical to, narrower than, and wider than the width of the active layer strips in the first and second amplifiers $OA_1$ and $OA_2$. The conventional width of the strips is, for example, 1.2 μm. When they are narrowed, the strips have a width of 0.5 μm, for example, and, when they are widened, they have a width of 2.8 μm, for example.

The aim is to obtain an output power level $P_s$ that is constant without degrading the extinction ratio ER or the signal-to-noise ratio S/N.

To this end, the structure of the active waveguide of at least one peripheral amplifier is modified. Preferably, it is the structure of the output amplifier that is modified as a priority to maintain a good extinction ratio in the output signal S, and thereby to avoid any distortion of said signal. The structures of the input amplifiers $OA_4$ then $OA_5$ can then be modified to avoid any distortion of the input signal E and of the output carrier wave M.

Figure 1:
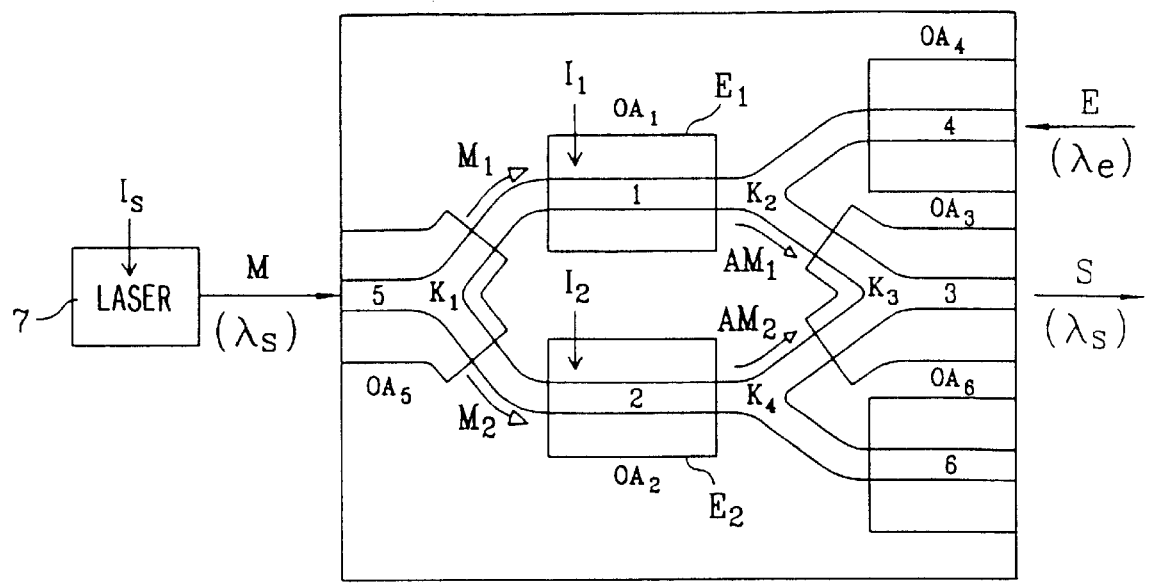
FIG. 1, described above, is a diagram showing a known Mach-Zehnder type interferometer structure having peripheral semiconductor optical amplifiers.

These curves show that, for the same output power $P_s$, the best extinction ratio ER and the best signal-to-noise ratio S/N are obtained when the active waveguide is widened. Widening the waveguide can make it possible for asymmetrical modes to be guided but they can then be filtered out by the coupler $K_3$ (FIGS. 1 and 3).

Therefore, it is preferable to widen the active waveguides in the peripheral amplifiers in order to increase the saturation power and to maintain an optimum extinction ratio.

This embodiment of a wavelength converter is very simple to make because it does not require any additional technological steps during manufacture. Only the shape of the mask used for etching the active waveguides changes.

In another variant, it is also possible to modify the structures of the active waveguides not only at the periphery, i.e. in the input amplifiers $OA_4$, $OA_5$ and/or in the output amplifier $OA_3$, but also as far as beyond the coupler $K_3$ and beyond the coupler $K_1$. The electrodes $E_3$, $E_4$, $E_5$ of the peripheral amplifiers are long and they extend respectively beyond the coupler $K_3$ and beyond the coupler $K_1$. Current is thus injected over the entire lengths of the electrodes and of the active waveguides. Therefore, the active waveguides can be modified not only at the ends of the interferometer structure but all the way to immediately before the inlets of the branches 1 and 2 of the interferometer, and also starting immediately after the outlets of said branches.

Other solutions also exist for modifying the ratio $S/\Gamma$. Thus, a second embodiment of a wavelength converter of the invention consists in modifying the lateral refractive index of at least one peripheral amplifier, i.e. the refractive index of the cladding layer in which the active waveguide of the peripheral amplifier is buried.

Figure 5:
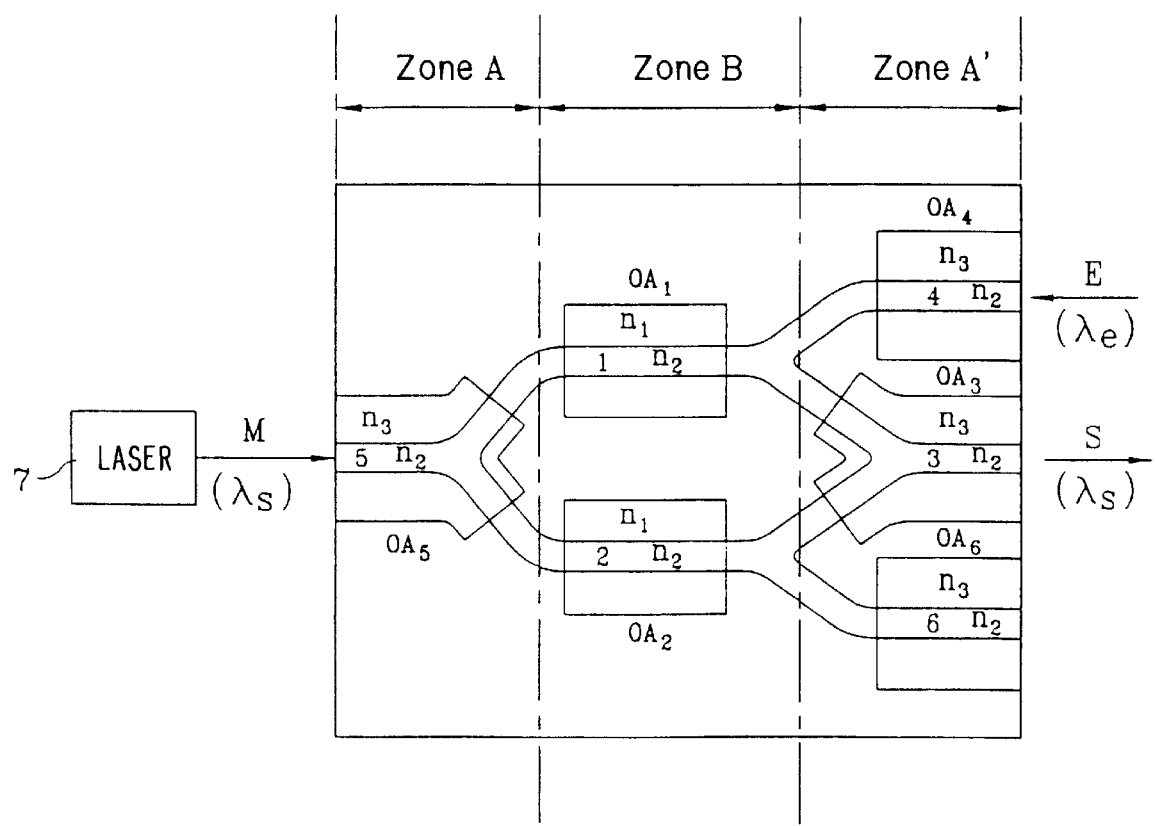
FIG. 5 is a diagram showing a second embodiment of a wavelength converter.

The diagram in FIG. 5 shows this embodiment. All of the active waveguides have the same refractive index $n_2$ which is greater than the refractive index of the cladding layers in which they are buried. The cladding layers of the peripheral amplifiers $OA_3$, $OA_4$, $OA_5$ have a refractive index $n_3$ that is different from the refractive index $n_1$ of the cladding layers of the first and second amplifiers $OA_1$ and $OA_2$.

In this case, the lateral refractive index is modified during manufacture of the converter. In general, the cladding layer of an amplifier is made of indium phosphide (InP). To modify the refractive index of the cladding layer, it is necessary, during manufacture, merely to replace the InP with another material, such as InGaAsP, for example, that has properties similar both to those of InP and to those of the active layer strip. This replacement is made after etching the active waveguide, and by epitaxially growing an InGaAsP cladding layer serving to bury the waveguide, instead of an InP cladding layer.

However, such a modification in lateral refractive index is more difficult to achieve than widening the waveguides. The cladding layers of the amplifiers $OA_3$, $OA_4$, $OA_5$ then do not have the same composition as those of the first and second amplifiers $OA_1$ and $OA_2$. The interferometer structure thus has a central first zone in which the cladding layers have a refractive index $n_1$ that is different from the refractive index $n_3$ in the cladding layers of the other two zones A and A' situated on either side of the zone B. Therefore, additional steps of etching and of resuming epitaxial growth are necessary to make the three zones A, B, and A' of the interferometer structure, thereby considerably complicating manufacture of the converter.

Figure 6A:
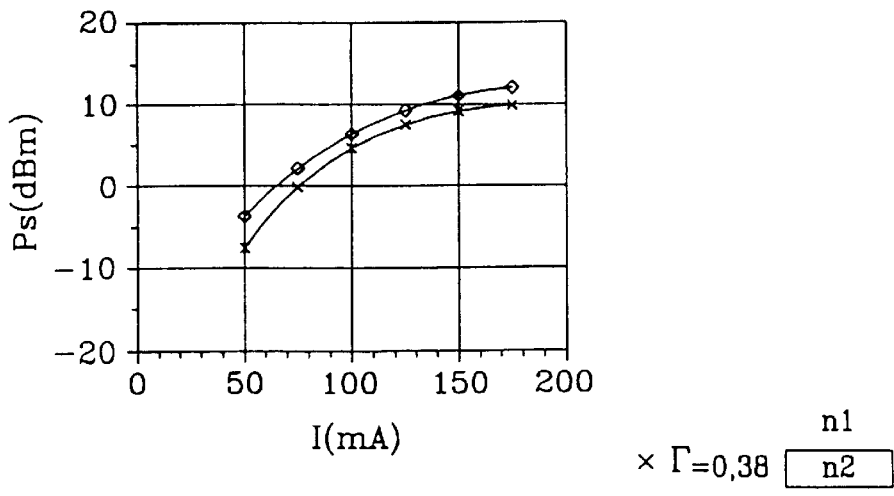
FIGS. 6A to 6C give curves respectively showing how the output power ($P_s$) the extinction ratio (ER), and the signal-to-noise ratio (S/N) vary as a function of the injected current (I) and of the refractive index of the cladding layer of a peripheral amplifier.
Figure 6B:
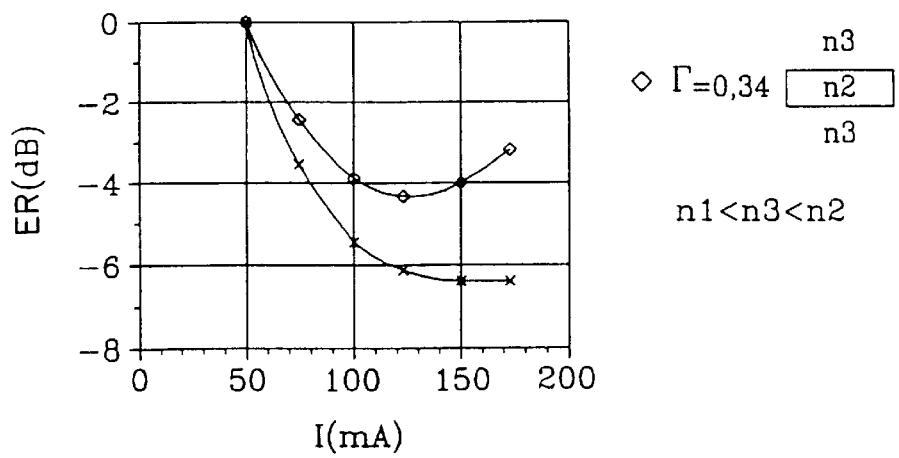
Figure 6C:
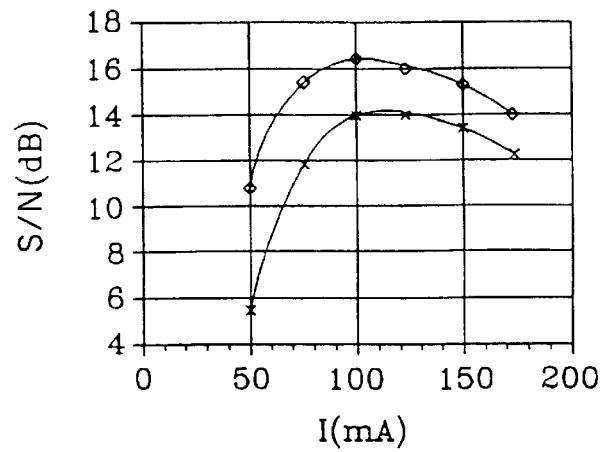

The curves given in FIG. 6A and 6C make it possible to compare the results obtained using two types of peripheral amplifier. The first type of peripheral amplifier has a cladding layer of refractive index $n_1$ less than the refractive index $n_2$ of the active waveguide. The second type of amplifier has a cladding layer of refractive index $n_3$ greater than the refractive index $n_1$ of the cladding layer of the first type of amplifier, but less than the refractive index $n_2$ of its active waveguide. These curves make it possible to show that, for constant output power level $P_s$, the amplifier that has the higher lateral refractive index ($n_3$), i.e. that has the lower lateral confinement, is the amplifier that makes it possible to obtain the better extinction ratio ER, and the better signal-to-noise ratio S/N.

A third embodiment of a wavelength converter of the invention consists in modifying the vertical dimensions, i.e. the thickness of the active waveguide of at least one of the amplifiers $OA_1$, $OA_2$ situated in the branches 1 and 2 of the interferometer, or of at least one of the peripheral amplifiers, i.e. the input amplifiers $OA_4$, $OA_5$ and/or the output amplifier $OA_3$. Thus, when the interferometer structure is made up of a stack of multiple layers defining a quantum-well structure, it can be necessary to reduce the number of quantum wells in an active waveguide so as to increase, or to decrease, as appropriate, the ratio $S/\Gamma$ of said waveguide. This is because etching quantum wells causes a variation both in the active area S and in the confinement factor $\Gamma$ of the active waveguide.

The variation in the ratio $S/\Gamma$ as a function of the thickness of the active layer is analogous to the variation in said ratio $S/\Gamma$ as a function of the width of the active layer, as shown in FIG. 2. However, in this case, the ratio $S/\Gamma$ is at its minimum when the thickness of the active layer is about 0.2 $\mu$m which is easy to control technologically, and is commonly used. It is possible for the initially made active waveguides to be of thickness less than or greater than this minimum of 0.2 $\mu$m. Depending on initial thickness values, etching is therefore not performed on waveguides of the same type.

When the thickness of the waveguides is less than or equal to the minimum of 0.2 $\mu$m, etching must be performed on the active waveguides of the peripheral amplifier(s). Thus, for example, a number of quantum wells equal to 15 suffices to obtain a saturation threshold that is low enough for the first and second amplifiers $OA_1$ and $OA_2$ situated in the branches 1 and 2 of the interferometer.

In contrast, to obtain a saturation threshold that is higher for the peripheral amplifiers, a portion of the thin layers forming the quantum-well structure must be removed, e.g. by etching. Thus, for example, ten out of fifteen quantum wells are etched away to increase the saturation threshold significantly.

Such a modification in the thickness d of the waveguides is preferably performed after the etching to shape them into strips of determined width W.

Such etching of the active waveguides in the peripheral amplifiers may also be performed in "bulk" structures. The local variation in the thickness of the active waveguides thus makes it possible to modify the ratio $S/\Gamma$. The difference in the thickness d of the active waveguides of the peripheral amplifiers relative to the thickness of the first and second amplifiers $OA_1$ and $OA_2$ is shown in FIGS. 7A to 7C.

Figure 7A:
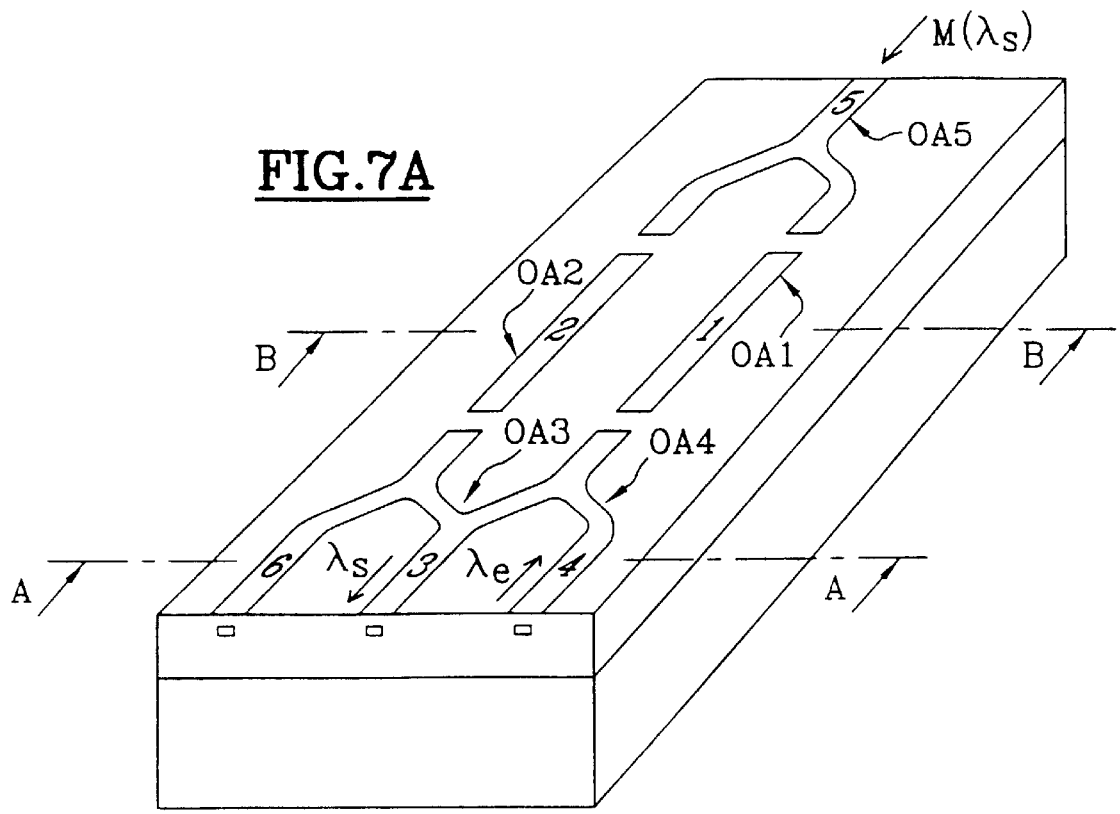
FIGS. 7A to 7C are respectively a diagrammatic perspective view and two diagrammatic section views of a third embodiment of a wavelength converter.

FIG. 7A is a diagrammatic perspective view of a wavelength converter of the invention. The reference 8 designates the substrate on which the interferometer structure is implemented, and the reference 9 designates the cladding layer surrounding the active waveguides of the structure.

Figure 7B:
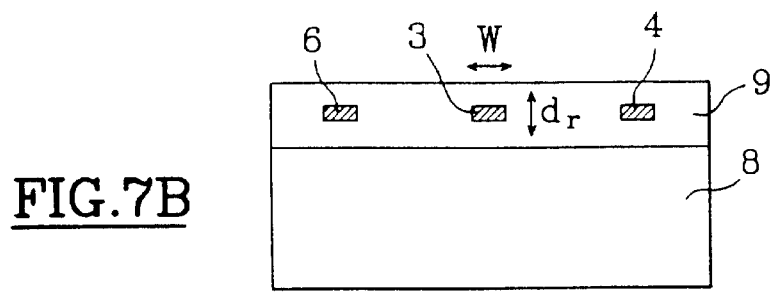
Figure 7C:
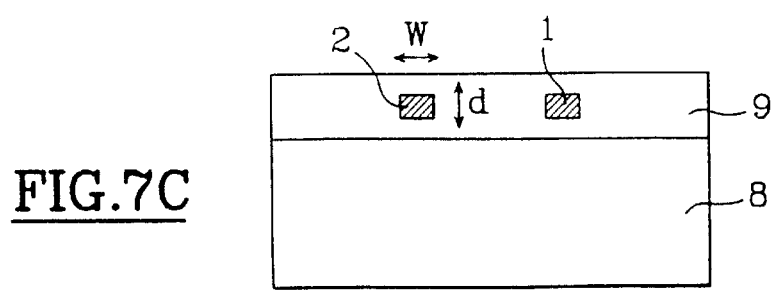

FIG. 7B is a diagrammatic cross-section view on AA of the FIG. 7A converter. This cross-section view shows in particular the active waveguides 3 and 4 of the input amplifier $OA_4$ and of the output amplifier $OA_3$. These waveguides have a width W, e.g. equal to 1.2 $\mu$m, and a reduced thickness $d_r$ of about 0.133 $\mu$m. FIG. 7C is a diagrammatic cross-section view on BB of the FIG. 7A converter. This cross-section view shows in particular the active waveguides of the first and second amplifiers $OA_1$ and $OA_2$ situated on respective ones of the branches 1 and 2 of the interferometer. These active waveguides have a width W identical to that of the waveguides situated at the periphery of the interferometer structure, i.e., in the example, a width equal to 1.2 μm. Their thickness d is greater than that of the peripheral waveguides. In the example shown, this thickness is preferably equal to 0.2 μm.

When the initial thickness of the waveguides is greater than the minimum value of 0.2 μm given by way of example, it is not the active waveguides of the peripheral amplifiers that are etched, but rather those of the first and second amplifiers $OA_1$ and $OA_2$ situated in the branches 1 and 2 of the interferometer. In this case, the ratio S/Γ of the waveguides corresponding to the first and second amplifiers $OA_1$ and $OA_2$ becomes less than that of the peripheral amplifiers $OA_3$, $OA_4$, and $OA_5$. This modification in the thickness of the waveguides of the amplifiers $OA_1$ and $OA_2$ may be performed in analogous manner to the manner described above for the peripheral amplifiers.

Figure 8:
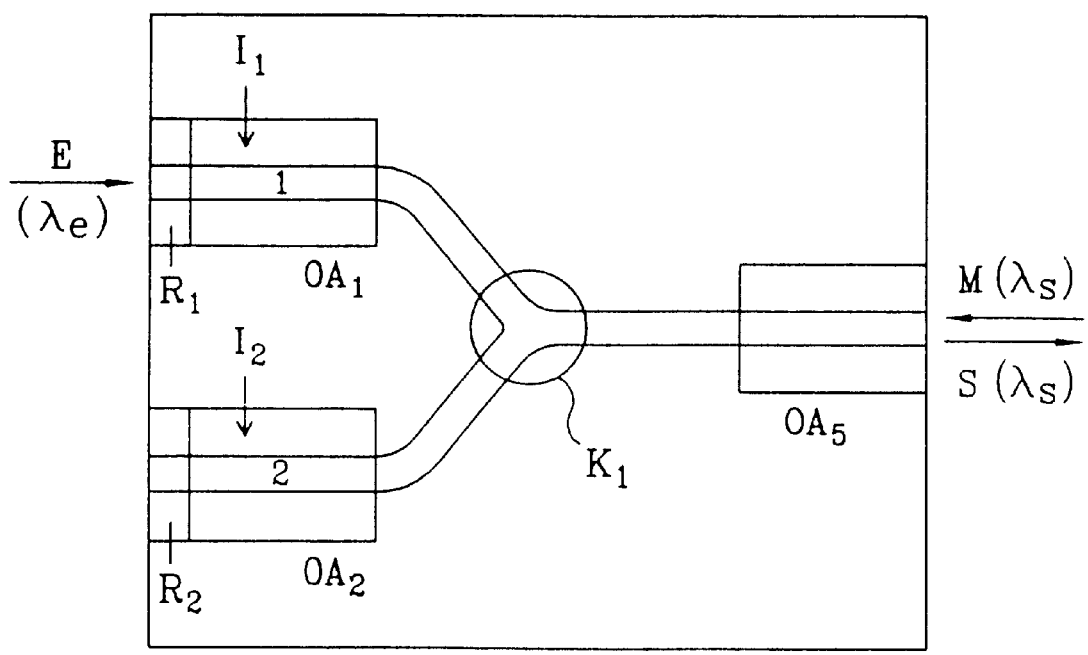
FIG. 8 is a diagram showing a Michelson-type structure to which the invention is applicable.

FIG. 8 shows a structure of the Michelson type equivalent to the preceding structure and to which the invention is applicable. In this variant, each of the two amplifiers $OA_1$ and $OA_2$ is coupled to the other via one of its ends only, with the opposite end faces being provided with reflective coatings $R_1$, $R_2$. The modulating input signal E is injected into the first amplifier $OA_1$ via the face $R_1$, and the wave M is injected into both amplifiers $OA_1$ and $OA_2$ via the faces opposite from the faces $R_1$ and $R_2$ by means of a coupler $K_1$ making it possible to couple one end of each of the branches 1 and 2 to a peripheral semiconductor optical amplifier $OA_5$. An output signal S of wavelength $\lambda_s$ and resulting from the coupling of the auxiliary waves delivered by the first and second amplifiers $OA_1$ and $OA_2$, is then amplified by the peripheral amplifier $OA_5$.

We claim:

1. A wavelength converter including an interferometer structure for delivering an output optical signal, in which converter first and second branches, including at least one first semiconductor optical amplifier, are coupled to input peripheral semiconductor optical amplifiers and/or to an output peripheral semiconductor optical amplifier, wherein the structure of the active waveguide of at least one peripheral amplifier is so designed that it has a ratio of active area to confinement factor greater than that of the active waveguide of said first amplifier.

2. A wavelength converter according to claim 1, wherein the active waveguide(s) of said peripheral amplifier(s) is/are wider than the active waveguide of said first amplifier.

3. A wavelength converter according to claim 1, wherein each of the active waveguides of the amplifiers is buried in a cladding layer, and wherein the cladding layer(s) of said peripheral amplifier(s) has/have a refractive index that is different from the refractive index of the cladding layer of said first amplifier, so as to modify the confinement factor of the lightwave travelling through the successive active waveguides.

4. A wavelength converter according to claim 3, wherein said peripheral amplifier(s) has/have a cladding layer/cladding layers whose refractive index is less than the refractive index of its/their active waveguide(s), but that is greater than the refractive index of the cladding layer of said first amplifier.

5. A wavelength converter according to claim 1, wherein the active waveguide(s) of said peripheral amplifier(s) has/have a thickness less than that of the active waveguide of said first amplifier.

6. A wavelength converter according to claim 5, wherein each of said active waveguides of the amplifiers contains multiple quantum well layers, and wherein the number of quantum wells in the active waveguide(s) of said peripheral amplifier(s) is less than the number of quantum wells in the waveguide of said first amplifier.

7. A wavelength converter according to claim 1, wherein the active waveguide(s) of said peripheral amplifier(s) has/have a thickness greater than that of the active waveguide of said first amplifier.

8. A wavelength converter according to claim 7, wherein each of the active waveguides of the amplifiers contains multiple quantum well layers, and wherein the number of quantum wells in the active waveguide(s) of said peripheral amplifier(s) is greater than the number of quantum wells in the waveguide of said first amplifier.

* * * * *